(12) United States Patent
Fukuda et al.

(10) Patent No.: US 12,036,523 B2
(45) Date of Patent: Jul. 16, 2024

(54) KNEADING STATE DETERMINATION SYSTEM, KNEADING STATE DETERMINATION DEVICE, OPERATION SCREEN OF KNEADING STATE DETERMINATION SYSTEM, AND KNEADING STATE DETERMINATION ASSISTING SYSTEM (71) Applicant: NIHON SPINDLE MANUFACTURING CO., LTD., Hyogo (JP)

(72) Inventors: Hiroyuki Fukuda, Hyogo (JP); Makoto Irie, Hyogo (JP)

(73) Assignee: NIHON SPINDLE MANUFACTURING CO., LTD., Hyogo (JP)

( * ) Notice: Subject to any disclaimer, the term of this patent is extended or adjusted under 35 U.S.C. 154(b) by 281 days.

(21) Appl. No.: 16/413,183

(22) Filed: May 15, 2019

(65) Prior Publication Data
US 2019/0262789 A1    Aug. 29, 2019

Related U.S. Application Data

(63) Continuation of application No. PCT/JP2017/040631, filed on Nov. 10, 2017.

(30) Foreign Application Priority Data

Nov. 21, 2016    (JP) .................................. 2016-226207

(51) Int. Cl.
*B01F 7/00*    (2006.01)
*B01F 27/272*    (2022.01)
(Continued)

(52) U.S. Cl.
CPC ........ *B01F 35/2209* (2022.01); *B01F 27/272* (2022.01); *B01F 35/2115* (2022.01);
(Continued)

(58) Field of Classification Search
CPC ............ B01F 15/00253; B01F 35/2209; B01F 35/2115; A21C 1/146; A21C 1/1455
See application file for complete search history.

(56) References Cited

U.S. PATENT DOCUMENTS

| | | | |
|---|---|---|---|
| 6,913,379 B2 | 7/2005 | Otsuka et al. | |
| 2010/0135352 A1* | 6/2010 | Tsuda | B01F 11/0283 374/45 |
| 2017/0225132 A1* | 8/2017 | Ozawa | B29B 7/7495 |

FOREIGN PATENT DOCUMENTS

| | | |
|---|---|---|
| JP | S58-024427 A | 2/1983 |
| JP | H06-344334 A | 12/1994 |

(Continued)

OTHER PUBLICATIONS

International Search Report issued in Application No. PCT/JP2017/040631, mailed Jan. 9, 2018.

*Primary Examiner* — Elizabeth Insler
(74) *Attorney, Agent, or Firm* — Michael Best & Friedrich LLP (57) ABSTRACT

A kneading state determination system includes a kneading unit and a determination unit. The kneading unit kneads a kneading material, and transmits a kneading state value indicating a kneading state to the determination unit. Based on the kneading state value transmitted from the kneading unit, the determination unit determines kneading of the kneading material in the kneading unit in accordance with a preset determination condition. The determination condition includes a determination period and a state value range. The state value range is set as a range for the kneading state (Continued)

value. The determination period is a partial period of a period from start to completion of the kneading in the kneading unit.

20 Claims, 4 Drawing Sheets

(51) Int. Cl.
*B01F 35/21* (2022.01)
*B01F 35/212* (2022.01)
*B01F 35/22* (2022.01)
*B29B 7/18* (2006.01)
*B29B 7/28* (2006.01)
*B01F 101/00* (2022.01)

(52) U.S. Cl.
CPC .............. *B01F 35/212* (2022.01); *B29B 7/18* (2013.01); *B29B 7/183* (2013.01); *B29B 7/28* (2013.01); *B29B 7/283* (2013.01); *B29B 7/286* (2013.01); *B01F 2101/2805* (2022.01)

(56) References Cited

FOREIGN PATENT DOCUMENTS

| | | | |
|---|---|---|---|
| JP | H06-344335 | A | 12/1994 |
| JP | 3574618 | B2 | 10/2004 |
| JP | 2010-214661 | A | 9/2010 |
| JP | 2014-226910 | A | 12/2014 |

* cited by examiner

KNEADING STATE DETERMINATION SYSTEM, KNEADING STATE DETERMINATION DEVICE, OPERATION SCREEN OF KNEADING STATE DETERMINATION SYSTEM, AND KNEADING STATE DETERMINATION ASSISTING SYSTEM

RELATED APPLICATIONS

Priority is claimed to Japanese Patent Application No. 2016-226207, filed Nov. 21, 2016, and International Patent Application No. PCT/JP2017/040631, the entire content of each of which is incorporated herein by reference.

BACKGROUND

Technical Field

Certain embodiments of the present invention relate to a kneading state determination system, a kneading state determination device, an operation screen of a kneading state determination system, and a kneading state determination assisting system.

Description of Related Art

As an apparatus for kneading viscous materials such as plastics and rubber, a closed type kneading machine is known. For example, in the related art, a closed type kneading machine is disclosed which includes a chamber for accommodating a kneading material, a pressurizing cap for closing an upper portion of the chamber, and a pair of rotors attached to an interior of the chamber.

SUMMARY

According to an embodiment of the present invention, there is provided a kneading state determination system including a kneading unit and a determination unit. The kneading unit kneads a kneading material, and transmits a kneading state value indicating a kneading state to the determination unit. Based on the kneading state value transmitted from the kneading unit, the determination unit determines kneading of the kneading material in the kneading unit in accordance with a preset determination condition. The determination condition includes a determination period and a state value range. The state value range is set as a range for the kneading state value. The determination period is a partial period of a period from start to completion of the kneading in the kneading unit.

According to another embodiment of the present invention, there is provided a kneading state determination device. The kneading state determination device receives a kneading state value indicating a kneading state from a kneading unit for kneading a kneading material, and determines kneading of the kneading material in the kneading unit in accordance with a preset determination condition. The determination condition includes a determination period and a state value range. The state value range is set as a range for the kneading state value. The determination period is a partial period of a period from start to completion of the kneading in the kneading unit.

According to still another embodiment of the present invention, there is provided an operation screen of a kneading state determination system, which is used in setting a determination condition of a kneading state determination system. The kneading state determination system receives a kneading state value indicating a kneading state from a kneading unit for kneading a kneading material, and determines kneading of the kneading material in the kneading unit in accordance with a preset determination condition. The operation screen has a determination period input unit for inputting a determination period according to the determination condition, and a state value range input unit for inputting a state value range according to the determination condition. The state value range is set as a range for the kneading state value. The determination period is a partial period of a period from start to completion of the kneading in the kneading unit.

According to still another embodiment of the present invention, there is provided a kneading state determination assisting system. The kneading state determination assisting system has a kneading unit and a display unit. The kneading unit kneads a kneading material, and transmits a kneading state value indicating a kneading state to the display unit. The display unit displays the kneading state value transmitted from the kneading unit and a preset determination condition, and assists the kneading of the kneading material in the kneading unit in accordance with the determination condition. The determination condition includes a determination period and a state value range. The state value range is set as a range for the kneading state value. The determination period is a partial period of a period from start to completion of the kneading in the kneading unit.

DETAILED DESCRIPTION

When kneading is performed using the closed type kneading machine in order to ensure reproducibility of the kneading, in many cases, a kneading time, a temperature of the kneading material, integrated power, and a combination thereof are used so that arrival at a predetermined value is set as kneading completion conditions. In this case, even if arrival values at a completion time point of the kneading are the same as each other, processes developed so far are different from each other. Therefore, the reproducibility of the kneading cannot be ensured in some cases.

As a method of determining variations in kneading quality, it is conceivable to determine the variations by measuring a physical property value of a kneaded product or by inspecting a function at a product stage. However, the determination takes time. In a case where it is determined that the product is defective after being subjected to a post-process, the post-process is unnecessarily performed, thereby resulting in greatly degraded productivity.

While the kneading is performed, it is also conceivable that an operator determines abnormality by monitoring each data obtained during the kneading. However, the variations are likely to occur in the determination. In addition, a state of a rubber material is greatly changed during the kneading. Consequently, it is difficult to instantaneously determine the abnormality.

It is desirable to provide a method for stably and efficiently determining a kneading state.

When it is determined whether or not the kneading is satisfactorily performed, a point to which a skilled worker pay attention during a kneading process is limited. The skilled worker does not need to monitor all data obtained from start to completion of the kneading. For example, when initial biting of the kneading is performed, variations are likely to occur in a time required for the biting, depending on various conditions such as a shape of a loaded material, a temperature condition, or a positional relationship of rotors. On the other hand, even if the variations slightly occur in a biting time, the kneading quality is not greatly affected. That is, in a case where only the biting time deviates from a reference, a satisfactory product may be produced as a result of the kneading. However, in a case where the whole period from start to completion of the kneading is a determination target, there is a possibility that a batch of the products produced in this way may be unfavorably determined as defective.

According to the above-described configuration, the determination condition includes the determination period and the state value range. The state value range is set as the range for the kneading state value. The determination period is the partial period of the period from start to completion of the kneading in the kneading unit. Accordingly, the determination can be efficiently made by using required data (state value range) at a required location (determination period). In addition, it is possible to set the determination condition so that an event having less influence on the kneading quality is not the determination target, and it is possible to stably make the determination. That is, according to the above-described configuration, the kneading state can be stably and efficiently determined.

According to another configuration of the kneading state determination system of the present invention, the determination period may be regulated by a time.

According to the above-described configuration, the determination period is regulated by the time. Therefore, the determination can be more easily and preferably made.

According to another configuration of the kneading state determination system of the present invention, the determination period may be regulated by an integrated power value.

The integrated power value is obtained by integrating power required for the kneading from when the kneading starts, and represents an amount corresponding to an amount of energy given to the kneading material. According to the above-described configuration, the determination period is regulated by the integrated power value. Therefore, the determination can be made in response to the energy given to the material by the kneading, and the determination can be stably and preferably made by reducing the influence on the event having less influence on the kneading quality, such as a slight delay in the biting time.

According to another configuration of the kneading state determination system of the present invention, the kneading state value may include at least one of power, a material temperature, and a ram position.

According to the above-described configuration, the kneading state value includes at least one of the power, the material temperature, and the ram position. Therefore, the kneading of the kneading material in the kneading unit can be properly and preferably determined.

Another configuration of the kneading state determination system of the present invention may further include a display unit that displays a reference kneading chart. The reference kneading chart may indicate variations in the kneading state value during the period from start to completion of the kneading in the kneading unit in a case where normal kneading is performed.

According to the above-described configuration, the kneading state determination system has the display unit that displays the reference kneading chart. The reference kneading chart indicates variations in the kneading state value during the kneading period from start to completion of the kneading in the kneading unit in the case where the normal kneading is performed. Accordingly, when the displayed reference kneading chart is observed, it is possible to confirm whether or not the determination condition is proper. Therefore, the kneading state determination system can be more conveniently and preferably used.

Another configuration of the kneading state determination system of the present invention may further include an input unit that receives an input of the determination condition.

According to the above-described configuration, in addition to the display unit that displays the reference kneading chart, the kneading state determination system has the input unit that receives the input of the determination condition. Accordingly, the determination condition can be properly input while the displayed reference kneading chart is observed. Therefore, the kneading state determination system can be much more conveniently and preferably used.

First Embodiment

Figure 1:
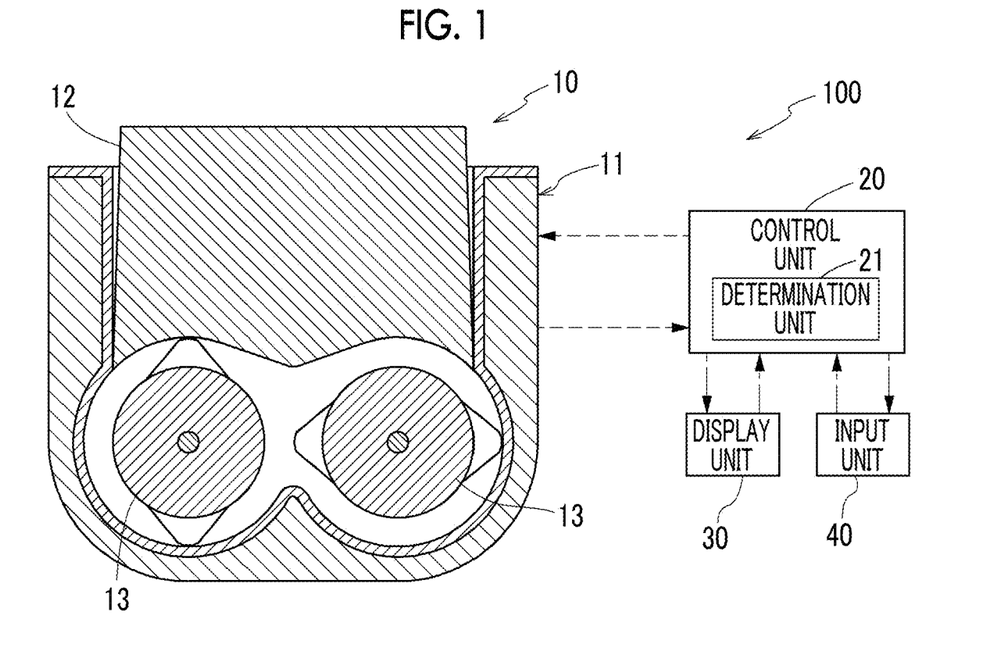
FIG. 1 is a view for describing a schematic configuration of a kneading state determination system.

Hereinafter, a kneading state determination system according to an embodiment of the invention will be described with reference to the drawings. As illustrated in FIG. 1, a kneading state determination system 100 is configured to include a kneading unit 10, a control unit 20, a display unit 30, and an input unit 40.

The kneading unit 10 kneads a kneading material such as plastic and rubber. The kneading unit 10 is configured to have a chamber 11, a ram 12 (pressurizing cap), and rotors 13.

The chamber 11 is a tank-shaped member for internally accommodating and kneading the kneading material. An upper portion of the chamber 11 is open, and the ram 12 is inserted from above.

The ram 12 is located in the chamber 11 in a state of being movable upward and downward. In a state where the ram 12 moves upward and the upper portion of the chamber 11 is open, the kneading material is loaded into the chamber 11. Thereafter, the ram 12 is moved downward. While the loaded kneading material is pressurized from above, the rotors 13 are rotated so as to knead the kneading material.

An interior of the chamber 11 has a shape in which a pair of cylinders whose center axes are parallel to each other is located in a state where side surfaces partially overlap each other. The pair of rotors 13 is rotatably located inside the chamber 11 in a state where center axes thereof coincide with the central axis of the cylinder. A surface of the rotor 13 has a spiral rotor blade.

The kneading unit 10 according to the embodiments of the invention transmits a kneading state value indicating a kneading state to the determination unit 21. Specifically, the kneading unit 10 transmits power to be consumed by the rotationally driven rotors 13, a material temperature which is a temperature of the kneading material, and a ram position showing a position of the ram 12, to the determination unit 21.

Specifically, the power consumed by the rotationally driven rotors 13 means power consumption of a motor (not illustrated) which rotationally drives the rotor 13, is monitored by a motor driving power circuit of the rotors 13, and is transmitted to the determination unit 21. The material temperature which is the temperature of the kneading material is measured by a temperature sensor (not illustrated) located in the chamber 11, and is transmitted to the determination unit 21. The ram position which is the position of the ram 12 is monitored by a sensor (not illustrated) for detecting the position of the ram 12, and is transmitted to the determination unit 21.

The control unit 20 controls each operation of the kneading unit 10, the display unit 30, and the input unit 40. The control unit 20 is configured to have a determination unit 21. Actually, programs corresponding to the determination unit 21 are stored in a ROM or a non-volatile memory (not illustrated). The programs are loaded to and executed by a CPU, thereby performing a process corresponding to the determination unit 21.

Based on the above-described kneading state value transmitted from the kneading unit 10, the determination unit 21 determines kneading of the kneading material in the kneading unit 10 in accordance with a preset determination condition. The determination condition will be described later.

The display unit 30 is controlled by the control unit 20 so as to display a reference kneading chart G (to be described later) and so as to additionally display an operation condition of the kneading unit 10 or a current operation status (kneading state value such as the power, the material temperature, and the ram position). Specifically, the display unit 30 is configured to include a display device such as a liquid crystal display.

The input unit 40 receives an input from an operator, such as an operation condition and a set value of the kneading unit 10 or the above-described determination condition, and transmits these to the control unit 20. Specifically, the input unit 40 is input means such as a keyboard and a numeric keypad. A touch panel type liquid crystal display may be used as a device which serves as both the display unit 30 and the input unit 40.

Figure 2:
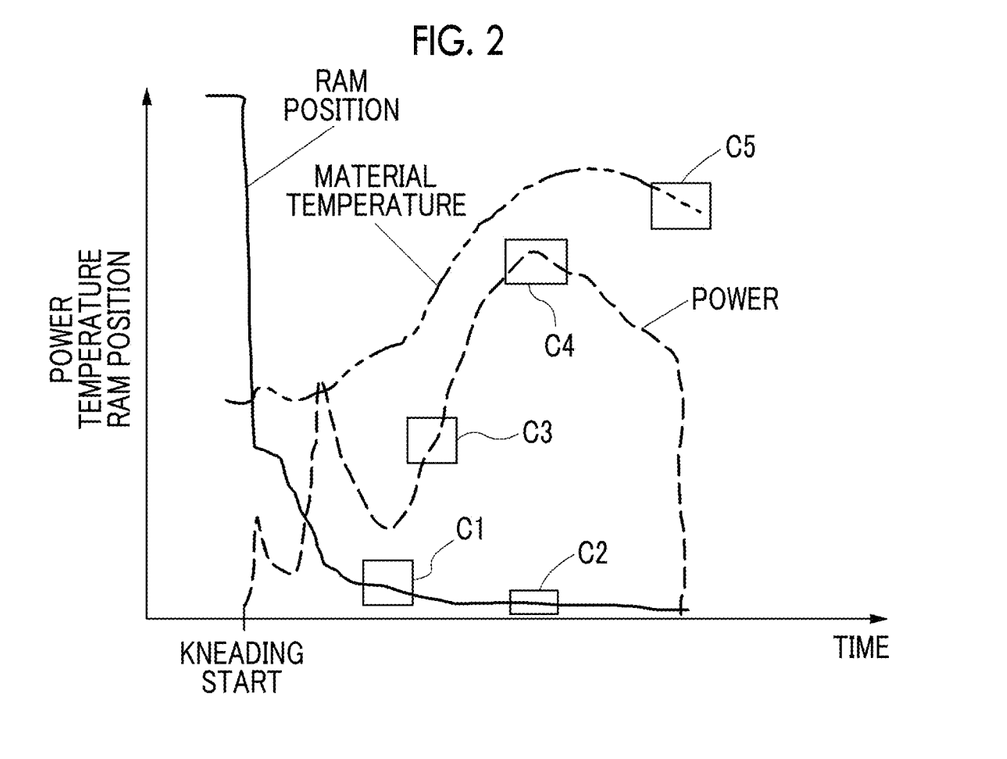
FIG. 2 is a view illustrating an example of a reference kneading chart and a determination condition.

A general kneading process for the kneading material which is performed in the above-described kneading unit 10 will be described with reference to FIG. 2. FIG. 2 illustrates variations in kneading state values (the power, the material temperature, and the ram position) during the period from start to completion of the kneading in the kneading unit 10 in a case where normal kneading is performed. A chart illustrating the variations in the kneading state in the normal kneading is stored in the control unit 20 as the reference kneading chart G.

First, a rubber polymer, a filler such as carbon, and an oil blended material are loaded into the chamber 11. The ram 12 descends so as to pressurize the kneading material, and the rotors 13 are rotated. Then, the kneading material is bitten between the rotor blades of the rotors 13 so as to perform the kneading (kneading start).

Immediately after the kneading starts, the kneading material is bitten by the rotors 13, and the rubber polymer is cracked (biting stage). As a result, the ram 12 descends, a value of the ram position decreases, and the power increases. Subsequently, in a process where the filler adheres to a rubber surface, the power decreases to a minimum value. In the subsequent process of integrating the rubber and the filler with each other, the power increases again, and the material temperature also increases (integration stage). Thereafter, the power reaches a maximum value (power peak), and thereafter, the power decreases. As a result, the temperature gently increases. In this stage, the filler is uniformly dispersed (dispersion stage).

After a predetermined time elapses, the kneading is completed. In addition to the lapse of the predetermined time, the condition for completion of the kneading includes a case where the temperature reaches a predetermined value, a case where the integrated power reaches a predetermined value, or a case where both the cases are combined with each other.

When it is determined whether or not the kneading is satisfactorily performed, a point to which a skilled worker pay attention during the kneading process is limited. The skilled worker does not need to monitor all data obtained from start to completion of the kneading. Therefore, in the kneading state determination system 100 according to the embodiments of the invention, the determination condition used in determining the kneading of the kneading material in the kneading unit 10 includes a determination period and a state value range. The state value range is set as a range for the kneading state value. The determination period is a partial period of the period from start to completion of the kneading in the kneading unit 10.

The determination condition according to the embodiments of the invention will be described with reference to FIG. 2. Five rectangular shapes C1 to C5 illustrated in FIG. 2 respectively indicate a first determination condition C1, a second determination condition C2, a third determination condition C3, a fourth determination condition C4, and the fifth determination condition C5.

The first determination condition C1 is that a value of the ram position within the state value range includes a value in a predetermined range (value x1A to value x1B) in a predetermined period (time t1A to time t1B).

That is, a position and a width in the horizontal axis direction of the rectangular shape of C1 illustrated in FIG. 2 indicate a range of the time of the first determination condition C1, and a position and a width in the vertical axis direction indicate a range of the value of the ram position of the first determination condition C1.

The second determination condition C2 is that a value of the ram position within the state value range includes a value in a predetermined range (value x2A to value x2B) in a predetermined period (time t2A to time t2B).

That is, a position and a width in the horizontal axis direction of the rectangular shape of C2 illustrated in FIG. 2 indicate a range of the time of the second determination condition C2, and a position and a width in the vertical axis direction indicate a range of the value of the ram position of the second determination condition C2.

The third determination condition C3 is that a value of the power within the state value range includes a value in a predetermined range (value x3A to value x3B) in a predetermined period (time t3A to time t3B). That is, a position and a width in the horizontal axis direction of the rectangular shape of C3 illustrated in FIG. 2 indicate a range of the time of the third determination condition C3, and a position and a width in the vertical axis direction indicate a range of the value of the power of the third determination condition C3.

The fourth determination condition C4 is that with regard to a value of the power within the state value range, a maximum value and a minimum value thereof fall within a predetermined range (value x4A to value x4B) in a predetermined period (time t4A to time t4B). That is, a position and a width in the horizontal axis direction of the rectangular shape of C4 illustrated in FIG. 2 indicate a range of the time of the fourth determination condition C4, and a position and a width in the vertical axis direction indicate a range of the value of the power of the fourth determination condition C4.

The fifth determination condition C5 is that a value of the material temperature within the state value range includes a value in a predetermined range (value x5A to value x5B) in a predetermined period (time t5A to time t5B).

That is, a position and a width in the horizontal axis direction of the rectangular shape of C5 illustrated in FIG. 2 indicate a range of the time of the fifth determination condition C5, and a position and a width in the vertical axis direction indicate a range of the value of the material temperature of the fifth determination condition C5.

In the kneading state determination system 100 according to the embodiments of the invention, the determination period of the first determination condition C1 to the fifth determination condition C5 is set to a partial period of the period from start to completion of the kneading as described above. Accordingly, the determination can be efficiently made by using required data (state value range) at a required location (determination period). In addition, it is possible to set the determination condition so that an event having less influence on kneading quality is not a determination target, and it is possible to stably make the determination. Hereinafter, referring to FIG. 2, description will be continued.

In the biting stage immediately after pressurization starts, it is important whether the kneading material is normally bitten. The ram 12 descends if the kneading material is normally bitten. Therefore, the determination is made under the first determination condition C1 by monitoring whether the value of the ram position falls within a normal range.

In a case where the kneading is disqualified for the first determination condition C1, there is a high possibility that the kneading material is not normally bitten. In this case, the control unit 20 may adopt a configuration in which the control unit 20 performs correction control so as to cause the ram 12 to increase the pressurizing force applied to the kneading material or so as to decrease the rotation speed of the rotors 13.

In the subsequent integration stage, in a case where the power slowly increases, there is a possibility that the kneading may not be progressively performed due to slippage between the rotor 13 and the kneading material. Therefore, the determination is made under the third determination condition C3 by monitoring whether the value of the power falls within a normal range.

In a case where the kneading is disqualified for the third determination condition C3, there is a possibility that the kneading may not be progressively performed. In this case, the control unit 20 may adopt a configuration in which the control unit 20 performs correction control so as to cause the ram 12 to increase the pressurizing force applied to the kneading material or so as to temporarily decrease the rotation speed of the rotor 13.

In the subsequent power peak, in order to confirm that a magnitude of a shearing force of the rotor 13 is normal, which is important in dispersion, the determination is made under the fourth determination condition C4 by monitoring whether a value of the power considered to indicate the magnitude of the shearing force falls within a normal range. In this case, the determination is concurrently made under the second determination condition C2 by monitoring whether the value of the ram position falls within the normal range.

Then, in the dispersion stage, the temperature of the kneading material has a proper temperature range when the kneading is completed.

Accordingly, the determination is made under the fifth determination condition C5 by monitoring whether a value of the material temperature falls within a normal range.

In a case where the kneading is disqualified for the fifth determination condition C5, there is a possibility that a filler may be insufficiently dispersed. In this case, the control unit 20 may adopt a configuration in which the control unit 20 performs correction control so as to extend the kneading time and further perform the kneading by using the rotors 13 until the material temperature falls within the normal range.

For each of the first determination condition C1 to the fifth determination condition C5, a configuration may be adopted in which the control unit 20 performs processing such as displaying an indication of the disqualification on the display unit 30 or emitting an alarm sound when the kneading is disqualified.

Figure 3:
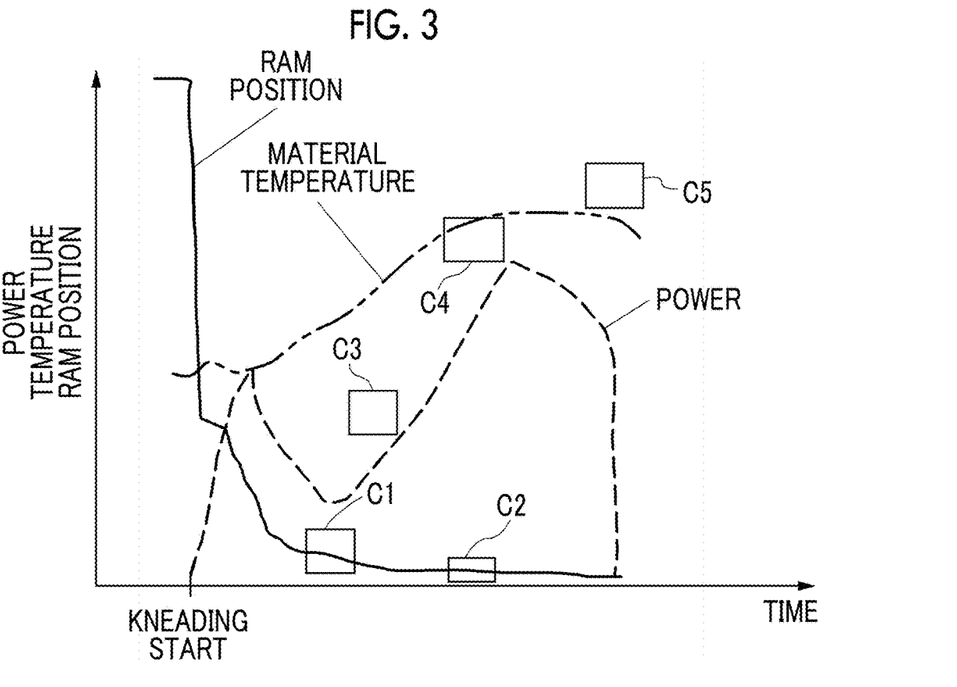
FIG. 3 is a view illustrating an example of kneading which is partially disqualified for the determination condition.

FIG. 3 illustrates an example in which the kneading is performed under the condition the same as that in FIG. 2 and the kneading is disqualified for some of the determination conditions. The power slowly (less) increases in the integration stage, and the value of power falls below a reference value under the third determination condition C3 and the fourth determination condition C4. In addition, the value of the material temperature falls below a reference value under the fifth determination condition C5. Based on whether or not the kneading is disqualified for the above-described determination conditions, it is considered that the kneading is slowly progressed in the batch of products and the kneading is insufficiently performed due to some reasons.

Second Embodiment

According to the above-described first embodiment, the determination period of the determination condition is regulated by the time. According to a second embodiment, the determination period of the determination condition is regulated by an integrated power value. In the following description of the second embodiment, the same reference numerals will be given to configurations which are the same as those according to the first embodiment, and description thereof may be omitted in some cases.

Figure 4:
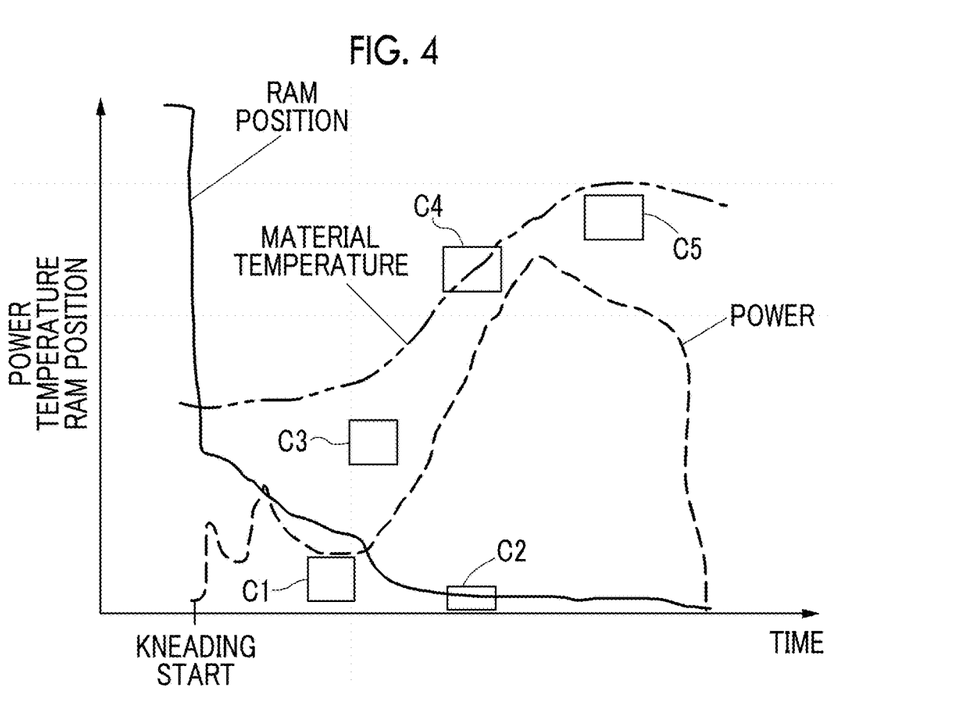
FIG. 4 is a view illustrating an example of kneading which is partially disqualified for the determination condition.

FIG. 4 illustrates an example of the kneading performed under the same conditions as that in FIG. 2. In the kneading, the value of the ram position is great in the biting stage, that is, the position of the ram 12 is continuously in a high state for a long time. In this manner, the kneading is disqualified for the first determination condition C1. Compared to a normal kneading state (reference kneading chart G) illustrated in FIG. 2, the ram position slowly decreases. In addition, in the integration stage, the power slowly increases compared to the reference kneading chart G, and the kneading is disqualified for the third determination condition C3.

However, if the kneading chart in FIG. 4 is compared with the reference kneading chart G in FIG. 2, respective variations in the ram position, the power, and the material temperature after the biting stage are substantially the same as each other. This means the following fact. The biting is delayed in the biting stage in the kneading illustrated in FIG. 2. However, the subsequent kneading varies as in the reference kneading chart G, and the normal kneading is performed.

Figure 5:
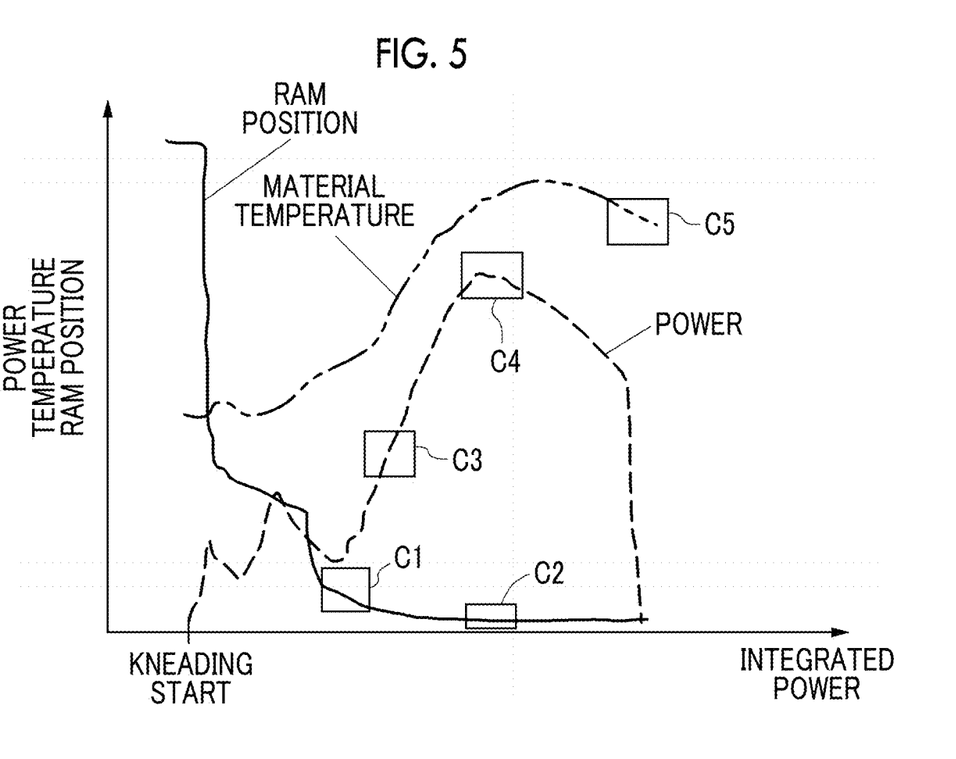
FIG. 5 is a view illustrating an example of the kneading illustrated in FIG. 4 by setting a horizontal axis as an integrated power value.

FIG. 5 is a plot of the kneading illustrated in FIG. 4 by setting the horizontal axis as the integrated power value instead of the time. Here, the integrated power value represents a value obtained by integrating the power required for the kneading from when the kneading starts (alternatively, any desired setting time), and is an amount corresponding to an amount of energy given to the kneading material. Specifically, each time data is plotted as follows. The power required from when the kneading starts is integrated (accumulated) so as to set the integrated power value. The integrated power value is set as the value of the horizontal axis. The ram position, the power, and the material temperature are set as the value of the vertical axis. Under the respective determination conditions, the determination is made by converting times (t1A, t1B, t2A, and t2B) for regulating the determination period into the integrated power value.

As illustrated in FIG. 5, if the integrated power value is set as the reference value, the kneading is qualified for all of the determination conditions of the first determination condition C1 to the fifth determination condition C5. The reason is as follows. In a case where the biting is defective in the biting stage, the power decreases. Accordingly, the integrated power value less increases, and the proper determination is made without being affected by a time delay in the biting. That is, the determination period is regulated by the integrated power value, and the determination is made based on the integrated power value. In this manner, the determination can be made using a response (of the ram position, the power, and the material temperature) to the energy actually given to the kneading. Therefore, it is possible to make the stable determination excluding the influence of the time delay caused by the event having less influence on the kneading quality.

Third Embodiment

According to the above-described first embodiment, the kneading state determination system 100 is configured to have the kneading unit 10, the control unit 20, the display unit 30, and the input unit 40. It is also possible to configure the kneading state determination device to be retrofitted into an existing kneading machine (kneading unit). In this case, the kneading state determination device is configured to have the control unit 20, the display unit 30, and the input unit 40. The kneading state determination device receives the kneading state value indicating the kneading state from the kneading unit 10 for kneading the kneading material, and determines the kneading of the kneading material in the kneading unit 10 in accordance with the preset determination condition. A configuration is adopted as follows. The determination condition includes a determination period and a state value range. The state value range is set as a range for the kneading state value. The determination period is a partial period of the period from start to completion of the kneading in the kneading unit.

Fourth Embodiment

Figure 6:
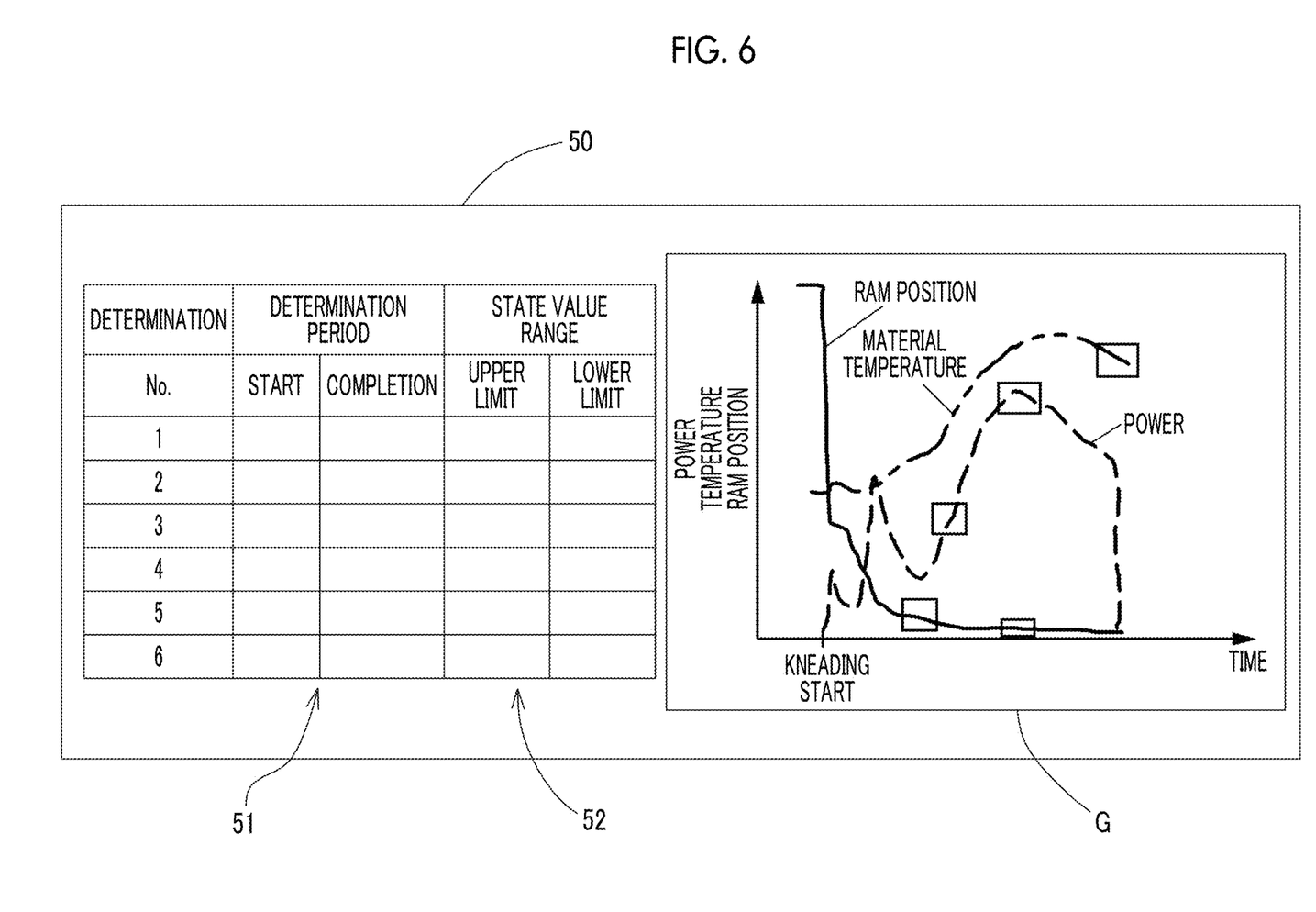
FIG. 6 is a view illustrating an example of an operation screen used in setting the determination condition.

FIG. 6 illustrates an example of an operation screen used in setting the determination condition in the kneading state determination system 100 or in the above-described kneading state determination device. An operation screen 50 is configured to have a determination period input unit 51 and a state value range input unit 52.

Specifically, the operation screen 50 is displayed on the kneading state determination system 100 or the display unit 30 of the kneading state determination device. The left side displays the determination period input unit 51 and the state value range input unit 52, and the right side displays the reference kneading chart G. The determination period input unit 51 is configured so that a start time and a completion time of the determination period can be respectively input thereto for determination conditions Nos. 1 to 6. The state value range input unit 52 is configured so that an upper limit value and a lower limit value of the state value range can be input thereto for the determination conditions Nos. 1 to 6.

That is, the operation screen 50 is an operation screen of the kneading state determination system 100.

The kneading state determination system 100 receives the kneading state value indicating the kneading state from the kneading unit 10 for kneading the kneading material, and determines the kneading of the kneading material in the kneading unit 10 in accordance with the preset determination condition. The operation screen 50 has the determination period input unit 51 for inputting the determination period according to the determination condition, and the state value range input unit 52 for inputting the state value range according to the determination condition. The state value range is the range for the kneading state value, and the determination period is a partial period of the period from start to completion of the kneading in the kneading unit.

Fifth Embodiment

It is possible to build a kneading state determination assisting system having the kneading unit 10 and the display unit 30. The kneading state determination assisting system assists an operator in determining the kneading of the kneading material in the kneading unit 10.

The kneading unit 10 kneads the kneading material, and transmits the kneading state value indicating the kneading state to the display unit 30. The display unit 30 displays the kneading state value transmitted from the kneading unit 10 and the preset determination condition. The determination condition is the same as that according to the first embodiment, and includes the determination period and the state value range. The state value range is set as a range for the kneading state value, and the determination period is a partial period of the period from start to completion of the kneading in the kneading unit 10.

According to the kneading state determination assisting system configured as described above, the operator observes the kneading state value and the determination condition which are displayed on the display unit 30, and can determine the kneading of the kneading material in the kneading unit in accordance with the determination condition.

OTHER EMBODIMENTS (1) The above-described embodiment is configured so that the state value range of the determination condition has the upper limit value and the lower limit value. For example, in the first determination condition C1, the state value range is set to the predetermined range (value x1A to value x1B). As a modification example, the state value range may be configured to have only the upper limit value or only the lower limit value. For example, the state value range may be equal to or greater than the value x1A, or may be equal to or smaller than the value x1B.

(2) In the above-described embodiment, a case has been described in which the determination condition is set so that the maximum value and the minimum value of the state value fall within the predetermined range in the predetermined period (fourth determination condition C4). As a modification example, the determination condition may be set so that the maximum value (or the minimum value) falls within the predetermined range. In this case, the state value range may be set to have the upper limit value and the lower limit value. Alternatively, the state value range may be set to have only the upper limit value or only the lower limit value.

(3) The determination condition may be set so that a time for the state value to indicate the maximum value (or the minimum value) falls within a predetermined period.

The configurations disclosed in the above-described embodiments (including the other embodiments, the same shall apply hereinafter) are applicable to a combination with the configurations disclosed in the other embodiments, as long as no contradiction arises. In addition, the embodiments disclosed herein are merely examples, and the embodiments according to the present invention are not limited thereto. The embodiments can be appropriately modified within the scope of the object of the present invention.

It should be understood that the invention is not limited to the above-described embodiment, but may be modified into various forms on the basis of the spirit of the invention. Additionally, the modifications are included in the scope of the invention.

What is claimed is:

1. A kneading state determination system comprising:
one or more processors;
a kneading unit including a rotor, the kneading unit configured to:
  perform, by rotating the rotor, a kneading operation that kneads a kneading material from a start of the kneading operation to a completion of the kneading operation, and
  transmit a first kneading state value and a second kneading state value with respect to a first determination condition from a plurality of determination conditions to the one or more processors, wherein the first kneading state value and the second kneading state value occurring at a beginning and an end of a first predetermined temporal range, respectively, and wherein the first predetermined temporal range occurs after a first predetermined period of time lapses from the start of the kneading operation; and
a memory storing instructions thereon, the instructions causing the one or more processors to be configured to:
  receive, during the kneading operation, the first kneading state value and the second kneading state value from the kneading unit;
  determine a first kneading state based on the first kneading state value and the second kneading state value;
  generate a notification based on the first kneading state that is determined; and
  output the notification.

2. The kneading state determination system according to claim 1, wherein the instructions cause the one or more processors to be configured to:
  control the kneading unit to change the kneading operation when the one or more processors determine that the first kneading state is outside of a first state value range; and
  control the kneading unit to maintain the kneading operation when the one or more processors determine that the first kneading state is not outside of the first state value range.

3. The kneading state determination system according to claim 1, wherein:

the kneading unit is further configured to:
  transmit a third kneading state value and a fourth kneading state value with respect to a second determination condition from a plurality of determination conditions to the one or more processors, wherein the third kneading state value and the fourth kneading state value occurring at a beginning and an end of a second predetermined temporal range, respectively, and wherein the second predetermined temporal range occurs after a second predetermined period of time lapses from the start of the kneading operation,
  determine a second kneading state based on the third kneading state value and the fourth kneading state value; and
  control the kneading unit in a manner that changes the kneading operation based on the second kneading state that is determined.

4. The kneading state determination system according to claim 3, wherein the instructions cause the one or more processors to be configured to:
  control the kneading unit to change the kneading operation when the one or more processors determine that the second kneading state is outside of a second state value range; and
  control the kneading unit to maintain the kneading operation when the one or more processors determine that the second kneading state is not outside of the second state value range.

5. The kneading state determination system according to claim 3, wherein:
the kneading unit is further configured to:
  transmit a fifth kneading state value and a sixth kneading state value with respect to a third determination condition from the plurality of determination conditions to the one or more processors, wherein the fifth kneading state value and the sixth kneading state value occurring at a beginning and an end of a third predetermined temporal range, respectively, and wherein the third predetermined temporal range occurs after a third predetermined period of time lapses from the start of the kneading operation,
  determine a third kneading state based on the fifth kneading state value and the sixth kneading state value, and
  control the kneading unit in a manner that changes the kneading operation based on the third kneading state that is determined.

6. The kneading state determination system according to claim 5, wherein the instructions cause the one or more processors to be configured to:
  control the kneading unit to change the kneading operation when the one or more processors determine that the third kneading state is outside of a third state value range; and
  control the kneading unit to maintain the kneading operation when the one or more processors determine that the third kneading state is not outside of the third state value range.

7. The kneading state determination system according to claim 3, wherein:
the first determination condition is one selected from a group consisting of a position of a ram of the kneading unit, a power of the kneading unit, and a material temperature of the kneading material,
the second determination condition is one selected from the group consisting of the position of the ram of the kneading unit, the power of the kneading unit, and the material temperature of the kneading material, and the first determination condition is different from the second determination condition.

8. The kneading state determination system according to claim 5, wherein:
the first determination condition is a position of a ram of the kneading unit,
the second determination condition is a power of the kneading unit; and
the third determination condition is a material temperature of the kneading material.

9. The kneading state determination system according to claim 5, wherein:
the kneading unit is further configured to:
transmit a seventh kneading state value and an eighth kneading state value with respect to a fourth determination condition from the plurality of determination conditions to the one or more processors, wherein the seventh kneading state value and the eighth kneading state value occurring at a beginning and an end of a fourth predetermined temporal range, respectively, and wherein the fourth predetermined temporal range occurs after a fourth predetermined period of time lapses from the start of the kneading operation;
determine a fourth kneading state based on the seventh kneading state value and the eighth kneading state value, and
control the kneading unit in a manner that changes the kneading operation based on the fourth kneading state that is determined.

10. The kneading state determination system according to claim 9, wherein the instructions cause the one or more processors to be configured to:
control the kneading unit to change the kneading operation when the one or more processors determine that the fourth kneading state is outside of a fourth state value range; and
control the kneading unit to maintain the kneading operation when the one or more processors determine that the fourth kneading state is not outside of the fourth state value range.

11. The kneading state determination system according to claim 9, wherein:
the kneading unit is further configured to:
transmit a ninth kneading state value and a tenth kneading state value with respect to a fifth determination condition from the plurality of determination conditions to the one or more processors, wherein the ninth kneading state value and the tenth kneading state value occurring at a beginning and an end of a fifth predetermined temporal range, respectively, and wherein the fifth predetermined temporal range occurs after a fifth predetermined period of time lapses from the start of the kneading operation
determine a fifth kneading state based on the ninth kneading state value and the tenth kneading state value, and control the kneading unit in a manner that changes the kneading operation based on the fifth kneading state that is determined.

12. The kneading state determination system according to claim 11, wherein the instructions cause the one or more processors to be configured to:
control the kneading unit to change the kneading operation when the one or more processors determine that the fifth kneading state is e outside of a fifth state value range; and
control the kneading unit to maintain the kneading operation when the one or more processors determine that the fifth kneading state is not outside of the fifth state value range.

13. The kneading state determination system according to claim 11, wherein the first predetermined period of time, the second predetermined period of time, the third predetermined period of time, the fourth predetermined period of time, and the fifth predetermined period of time are different from each other.

14. The kneading state determination system according to claim 2, wherein the instructions cause the one or more processors to be configured to vary the first predetermined temporal range, the first state value range, or both the first predetermined temporal range and the first state value range.

15. The kneading state determination system according to claim 1, wherein the first determination condition is one selected from a group consisting of a position of a ram of the kneading unit, a power of the kneading unit, and a material temperature of the kneading material.

16. The kneading state determination system according to claim 1, wherein the instructions cause the one or more processors to be configured to determine kneading of the kneading material in the kneading unit multiple times in accordance with the plurality of determination conditions during a period from start to completion of the kneading in the kneading unit.

17. The kneading state determination system according to claim 1, wherein the instructions cause the one or more processors to be configured to control the kneading unit in a manner that changes the kneading operation based on the first kneading state that is determined.

18. The kneading state determination system according to claim 1, wherein the notification indicates a disqualification of the kneading operation.

19. The kneading state determination system according to claim 1, wherein, to output the notification, the instructions cause the one or more processors to be configured to output the notification to a display screen.

20. The kneading state determination system according to claim 1, wherein, to output the notification, the instructions cause the one or more processors to be configured to output the notification to an alarm device, wherein the notification controls the alarm device to generate an alarm.

* * * * *